(12) United States Patent
Lentz et al.

(10) Patent No.: US 10,705,222 B2
(45) Date of Patent: Jul. 7, 2020

(54) GNSS MULTIPATH MITIGATION USING SLOPE-BASED CODE DISCRIMINATOR

(71) Applicant: Trimble Inc., Sunnyvale, CA (US)

(72) Inventors: William Lentz, Portland, OR (US); Nicholas Talbot, Ashburton (AU)

(73) Assignee: Trimble Inc., Sunnyvale, CA (US)

( * ) Notice: Subject to any disclaimer, the term of this patent is extended or adjusted under 35 U.S.C. 154(b) by 476 days.

(21) Appl. No.: 15/478,834

(22) Filed: Apr. 4, 2017

(65) Prior Publication Data

US 2018/0284288 A1 Oct. 4, 2018

(51) Int. Cl.
*G01S 19/22* (2010.01)
*G01S 19/30* (2010.01)
*H04B 1/709* (2011.01)

(52) U.S. Cl.
CPC .............. *G01S 19/22* (2013.01); *G01S 19/30* (2013.01); *H04B 1/709* (2013.01)

(58) Field of Classification Search
None
See application file for complete search history.

(56) References Cited

U.S. PATENT DOCUMENTS

| | | |
|---|---|---|
| 2009/0213912 A1 | 8/2009 | Brenner |
| 2016/0132768 A1* | 5/2016 | Ray .......................... G06N 3/08 706/22 |

OTHER PUBLICATIONS

Townsend, B. et al., "A Practical Approach to the Reduction of Pseudorange Multipath Errors in a L1 GPS Receiver," Proceedings of the Institute of Navigation (ION) GPS, vol. 1, Jan. 1, 1994, pp. 143-148.
International Search Report and the Written Opinion of the International Searching Authority for Application No. PCT/2018/025105, dated Jul. 12, 2018, 15 pages.

* cited by examiner

*Primary Examiner* — Whitney Moore
(74) *Attorney, Agent, or Firm* — Kilpatrick Townsend & Stockton

(57) ABSTRACT

A GNSS receiver for generating distance estimates from multiple GNSS satellites. The GNSS receiver includes an antenna and an RF front end coupled to the antenna configured to generate a plurality of samples related to a received signal. The GNSS receiver includes a correlator coupled to the RF front end configured to perform various operations including performing three correlations on the plurality of samples with three local code to generate three correlation results, where the three local codes are shifted in time or distance with respect to each other. The GNSS receiver includes a processor for defining a first slope using the first correlation result and the second correlation result, defining a second slope using the second correlation result and the third correlation result, and defining a code discriminator as a sum of the first slope and the second slope.

12 Claims, 16 Drawing Sheets

GNSS MULTIPATH MITIGATION USING SLOPE-BASED CODE DISCRIMINATOR

BACKGROUND

Global navigation satellite systems (GNSS) use wireless signals transmitted from medium Earth orbit (MEO) satellites to provide position and velocity information of GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing. Further applications for GNSS technology will become available as new techniques for improving GNSS accuracy are introduced.

One source of GNSS inaccuracy is multipath interference, which is caused by wireless signals reflecting off objects surrounding the GNSS receiver, such as mountains, trees, buildings, ground, water, persons, etc. Multipath signals arrive at the GNSS receiver later than the line-of-sight (LOS) signal, and although multipath signals with large time delays can be filtered out, multipath signals with shorter delays often distort the correlation function shape used for time delay estimation. Current methods for mitigating multipath interference are insufficient. Accordingly, new systems, methods, and techniques for mitigating multipath interference are needed.

SUMMARY

Embodiments of the present disclosure include a global navigation satellite system (GNSS) receiver. The GNSS receiver may include an antenna for receiving wireless signals transmitted by a GNSS satellite. The GNSS receiver may also include a radio frequency (RF) front end coupled to the antenna and configured to generate a plurality of samples related to the wireless signals. The GNSS receiver may further include a correlator coupled to the RF front end. The correlator may be configured to perform operations including receiving the plurality of samples from the RF front end. The operations may also include performing a first correlation on the plurality of samples with a first local code using a first multiplier to generate a first correlation result, performing a second correlation on the plurality of samples with a second local code using a second multiplier to generate a second correlation result, and performing a third correlation on the plurality of samples with a third local code using a third multiplier to generate a third correlation result. In some embodiments, the first local code, the second local code, and the third local code are shifted in time or distance with respect to each other. In some embodiments, GNSS receiver may include a processor coupled to the correlator. The processor may be configured to perform actions including defining a first slope using the first correlation result and the second correlation result. The actions may also include defining a second slope using the second correlation result and the third correlation result. The actions may further include defining a code discriminator as a sum of the first slope and the second slope.

In some embodiments, the actions include determining that the code discriminator is nonzero. In some embodiments, the actions include generating a correction amount for shifting each of the first local code, the second local code, and the third local code to drive the code discriminator toward zero. In some embodiments, the actions include sending the correction amount to the correlator. In some embodiments, the operations include receiving the correction amount from the processor. In some embodiments, the operations also include shifting each of the first local code, the second local code, and the third local code by the correction amount. In some embodiments, the operations further include performing, for a second time, the first correlation, the second correlation, and the third correlation and causing an update of the code discriminator.

In some embodiments, the actions include determining that the code discriminator is zero. In some embodiments, the actions also include generating a distance estimate between the GNSS receiver and the GNSS satellite based on one or more of the first local code, the second local code, and the third local code. In some embodiments, defining the first slope using the first correlation result and the second correlation result includes subtracting the first correlation result from the second correlation result and weighting the second correlation result by a weighting factor greater than zero and less than one. In some embodiments, defining the second slope using the second correlation result and the third correlation result includes subtracting the second correlation result from the third correlation result and weighting the second correlation result by the weighting factor. In some embodiments, defining the code discriminator as the sum of the first slope and the second slope includes weighting the second slope by a weighting factor greater than zero and less than one. In some embodiments, the actions include generating a multipath estimate based on the first correlation result, the second correlation result, and the third correlation result using a neural network.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
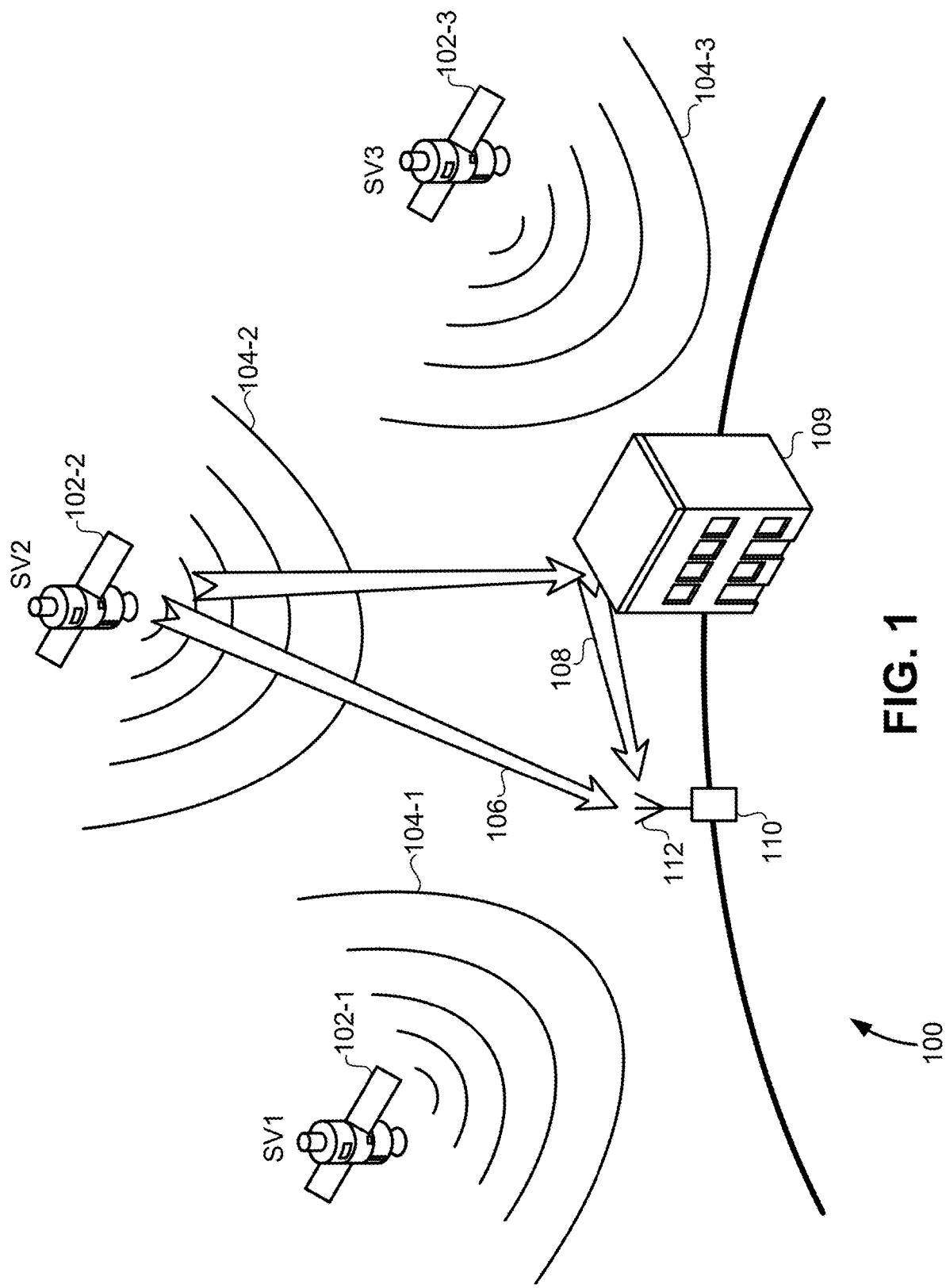
FIG. 1 illustrates a global navigation satellite system (GNSS), according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

For many global navigation satellite system (GNSS) receivers, correlation is a critical operation that allows the GNSS receiver to sync with multiple GNSS satellites and generate a distance estimate for each satellite with accuracy on the order of meters. Correlation is performed within the GNSS receiver between a pseudo-random noise (PRN) code (i.e., ranging codes) transmitted by the GNSS satellite and a local code generated within the GNSS receiver. Each satellite within a GNSS constellation has a unique PRN code that comprises a series of "on" and "off" pulses that are modulated onto a carrier frequency. For Global Positioning System (GPS) satellites, the PRN code is modulated onto two carrier frequencies, the L1 carrier frequency (1575.42 MHz), which carries both a status message and the PRN code for timing, and the L2 carrier frequency (1227.60 MHz), which is used for the more precise military PRN.

Before correlation is performed using the PRN code, the GNSS receiver first receives the wireless signal transmitted by the GNSS satellite containing the PRN code modulated onto L1 and/or L2 carrier via an antenna. The antenna is electrically coupled to a radio frequency (RF) front end which amplifies (e.g., using a low-noise amplifier), mixes (e.g., using a local oscillator), filters (e.g., using a band-pass filter), and samples the wireless signal (e.g., using an analog-to-digital converter). The samples, which correspond to samples of the PRN code, are sent to a correlator, to one or more correlators, or to a processor or digital signal processing unit where one or more correlations are performed. The correlator may use one or more multipliers and integrators to perform a correlation between the sampled PRN code and one or more local codes which correspond to shifted or translated versions of each other. The results of each of the correlations correspond to samples of a cross-correlation between the PRN code and a local code (which may correspond to an auto-correlation function where the PRN code and the local code are identical).

GNSS receivers aim at tracking the peak of the auto-correlation function and shifting (delaying) the local codes to identify a maximum correlation value. When a maximum value of the auto-correlation function is found, the corresponding shift or time delay of the local codes can be used to generate a distance estimate (also referred to as pseudorange). Unfortunately, distance estimates may be inaccurate due to multipath interference caused by wireless signals reflecting off objects surrounding the GNSS receiver. Multipath signals distort both the in-phase (I) and quadrature (Q) auto-correlation functions with constructive and destructive effects such that a peak in an auto-correlation function may not necessarily align with a local code shift that corresponds to an accurate distance estimate. For example, constructive multipath interference may cause the measured auto-correlation function to have a maximum correlation value at a longer delay than would otherwise be measured in the absence of the constructive interference. Conversely, destructive multipath interference may cause the measured auto-correlation function to have a maximum correlation value at a shorter delay than would otherwise be measured in the absence of the destructive interference.

In some conventional approaches, three correlations are performed to generate three correlation results. A first correlation result is generated by correlating the sampled received signal with a local code corresponding to a sampled replica of the PRN code shifted earlier in time, i.e., early (E). A second correlation result is generated by correlating the sampled received signal with a local code corresponding to a sampled replica of the PRN code aligned in time, i.e., prompt (P). A third correlation result is generated by correlating the sampled received signal with a local code corresponding to a sampled replica of the PRN code shifted later in time, i.e., late (L). In a first conventional approach, the correlations are iteratively performed (while adjusting time delays) until $E-L=0$ and $P>E, L$ such that E, P, and L form a triangle at a peak of the auto-correlation function. In a second conventional approach, the correlations are iteratively performed until $E-P=0$ such that E and P are aligned with the two sides of a peak of the auto-correlation function. In the second conventional approach, L is used to generate a multipath estimate. The conventional approaches has several disadvantages, including poor distance estimation in situations with heavy multipath interference. For example, because the conventional approaches always attempt to identify the maximum correlation value, the further the maximum correlation value deviates from the value under ideal conditions, the more imprecise the distance estimates become. Furthermore, conventional approaches often only work with coherent tracking, i.e., where the PRN code is entirely in the in-phase component of the auto-correlation function.

Embodiments of the present disclosure provide systems and methods for generating accurate distance estimates by processing samples related to wireless signals received from GNSS satellites using multiple correlations (e.g., three, four, six, or eight). A GNSS receiver, according to embodiments of the present disclosure, performs additional correlations of sampled in-phase and quadrature components of the received signals to refine correlation results E and P, and additionally refine a correlation result, very early (VE), that is generated by correlating the sampled received signal with a local code corresponding to a sampled replica of the PRN code shifted earlier in time than that for E. Distance estimates may be generated based on identifying time delays such that a first slope (between VE and E) is equal and opposite in sign to a second slope (between E and P) where the second slope is weighted by a weighting factor greater than zero. By weighting the second slope, distortions of the auto-correlation function caused by multipath interference are better modeled and accounted for. Embodiments of the present disclosure also provide multipath estimates based on the correlation results and using a neural network. Results from the neural network may be used to refine the distance estimates and improve positioning accuracy. Simulation results presented herein demonstrate improved positioning of the new approach over the conventional approaches by several meters in some circumstances.

FIG. 1 illustrates a GNSS 100, according to an embodiment of the present disclosure. GNSS 100 includes one or more GNSS satellites 102, i.e., space vehicles (SV), in orbit above a GNSS receiver 110. GNSS satellites 102 continuously, periodically, or intermittently broadcast wireless signals 104 containing PRN codes modulated onto L1 and/or L2 carrier frequencies. Broadcasted wireless signals 104 include both direct wireless signals 106, i.e., signals transmitted and received without reflection off objects, and reflected wireless signals 108, i.e., signals received by GNSS receiver 110 after reflection off at least one object, such as object 109. Direct wireless signals 106 and reflected wireless signals 108 are received by antenna 112 positioned within, on, or near GNSS receiver 110, which may be a geodetic antenna, a rover antenna, or a handheld receiver antenna, among others. Different wireless signals 104 may include different PRN codes that identify a particular GNSS satellite 102 such that GNSS receiver 110 may associate different distance estimates to different GNSS satellites 102. For example, GNSS satellite 102-1 broadcasts wireless signals 104-1 which contain a different PRN code than the PRN code contained in wireless signals 104-2 broadcasted by GNSS satellite 102-2. Similarly, GNSS satellite 102-3 broadcasts wireless signals 104-3 which contain a different PRN code than the PRN codes contained in wireless signals 104-1 and 104-2 broadcasted by GNSS satellites 102-1 and 102-2, respectively.

Merely by way of example, GNSS receiver 110 may use the three distance estimates between it and GNSS satellites 102-1, 102-2, and 102-3 to generate a position estimate through a process called trilateration. Trilateration involves creating three spheres having center locations corresponding to the locations of the GNSS satellites 102 and radii corresponding to the distance estimates. The three spheres intersect at two locations, one of which is more plausible than the other given the position of the earth. The less plausible location is disregarded and the more plausible location is used as the position estimate for GNSS receiver 110. The position estimate may be continuously, periodically, or intermittently updated by generating new distance estimates and performing trilateration. Subsequent position estimates may benefit from previous position estimates through filtering processes (e.g., Kalman filter) capable of improving position estimate accuracy. Position estimates may be determined using other techniques. In practice, a fourth satellite may be observed to estimate the receiver clock error with respect to the satellite system time.

Figure 2:
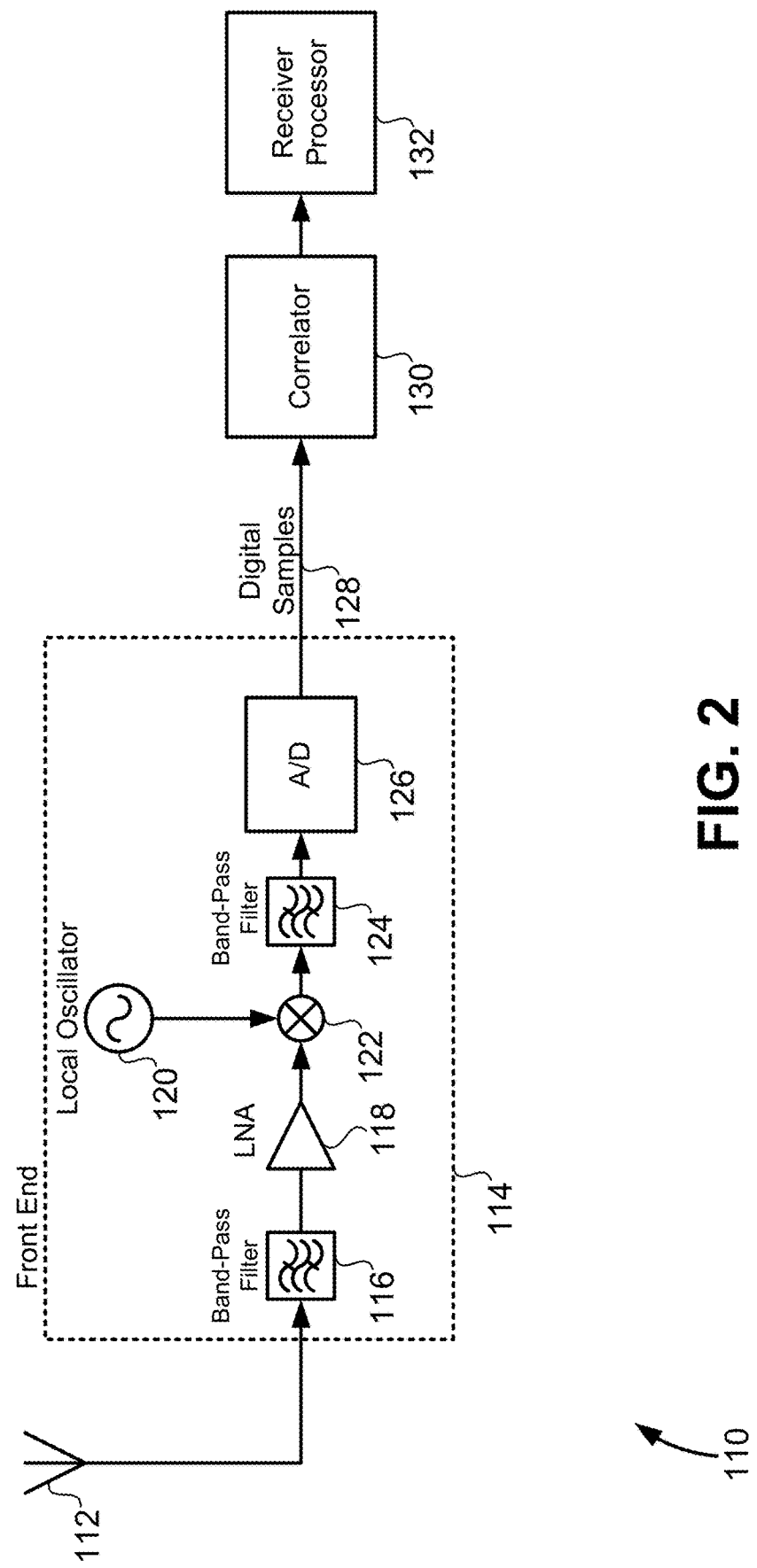
FIG. 2 illustrates a block diagram of a GNSS receiver, according to an embodiment of the present disclosure.

FIG. 2 illustrates a block diagram of GNSS receiver 110, according to an embodiment of the present disclosure. GNSS receiver 110 includes antenna 112 for receiving wireless signals 104 and sending/routing a signal related to wireless signals 104 to an RF front end 114. Antenna 112 may be linearly or circularly polarized, may be mounted or embedded, may be a single antenna or an array antenna, may have a narrow or wide bandwidth, among other possibilities. RF front ends are well known in the art, and in some instances include a band-pass filter 116 for initially filtering out undesirable frequency components outside the frequencies of interest, a low-noise amplifier (LNA) 118 for amplifying the received signal, a local oscillator 120 and a mixer 122 for down converting the received signal from RF to intermediate frequencies (IF), a band-pass filter 124 for removing frequency components outside IF, and an analog-to-digital (A/D) converter for sampling the received signal to generate digital samples 128.

In some instances, RF front end 114 includes additional or fewer components than that shown in FIG. 2. For example, RF front end 114 may include a second local oscillator (90 degrees out of phase with respect to the first), a second mixer, a second band-pass filter, and a second A/D converter for generating digital samples corresponding to the quadrature component of wireless signals 104. Digital samples corresponding to the in-phase component of wireless signals 104 and digital samples corresponding to the quadrature component of wireless signals 104 may both be sent to a correlator 130. For simplicity of the present disclosure, digital samples corresponding to both in-phase and quadrature components may be included in digital samples 128.

Other components within RF front end 114 may include a phase-locked loop (PLL) for synchronizing the phase of local oscillator 120 with the phase of the received signal, and a phase shifter for generating a second mixing signal using local oscillator 120 that is 90 degrees out of phase with local oscillator 120. In some embodiments, RF front end 114 does not include band-pass filter 116 and LNA 118. In some embodiments, A/D converter 126 is coupled directly to antenna 112 and samples the RF signal directly without down-conversion to IF. In some embodiments, RF front end 114 only includes band-pass filter 116 and A/D converter 126. Other possible configurations of RF front end 114 are possible.

Digital samples 128 generated by RF front end 114 are sent to a correlator 130 and/or a receiver processor 132. Correlator 130 performs one or more correlations on digital samples 128 using local codes. One or more operations performed by correlator 130, described in reference to FIGS. 3A, 3B, 4A, and 4B may alternatively be performed by receiver processor 132. In some embodiments, correlator 130 is a specific piece of hardware, such as an application-specific integrated circuit (ASIC) or a field-programmable gate array (FPGA). In some embodiments, operations performed by correlator 130 are performed entirely in software using digital signal processing (DSP) techniques. Therefore, although correlator 130 and receiver processor 132 are depicted in FIG. 2 as two separate components, in some instances, they may be considered as a single component that generates distance estimates using digital samples 128.

Figure 3A:
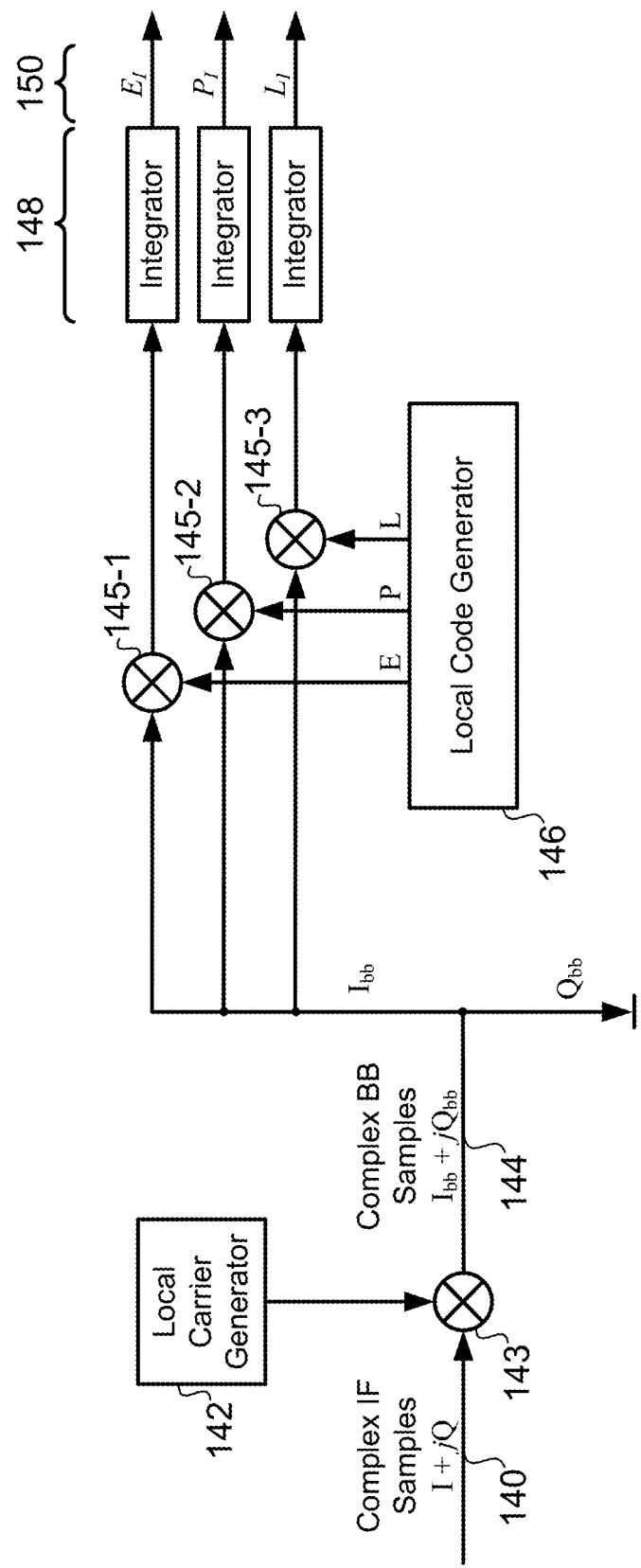
FIGS. 3A and 3B illustrate an example of a correlator in accordance with conventional techniques.
Figure 3B:
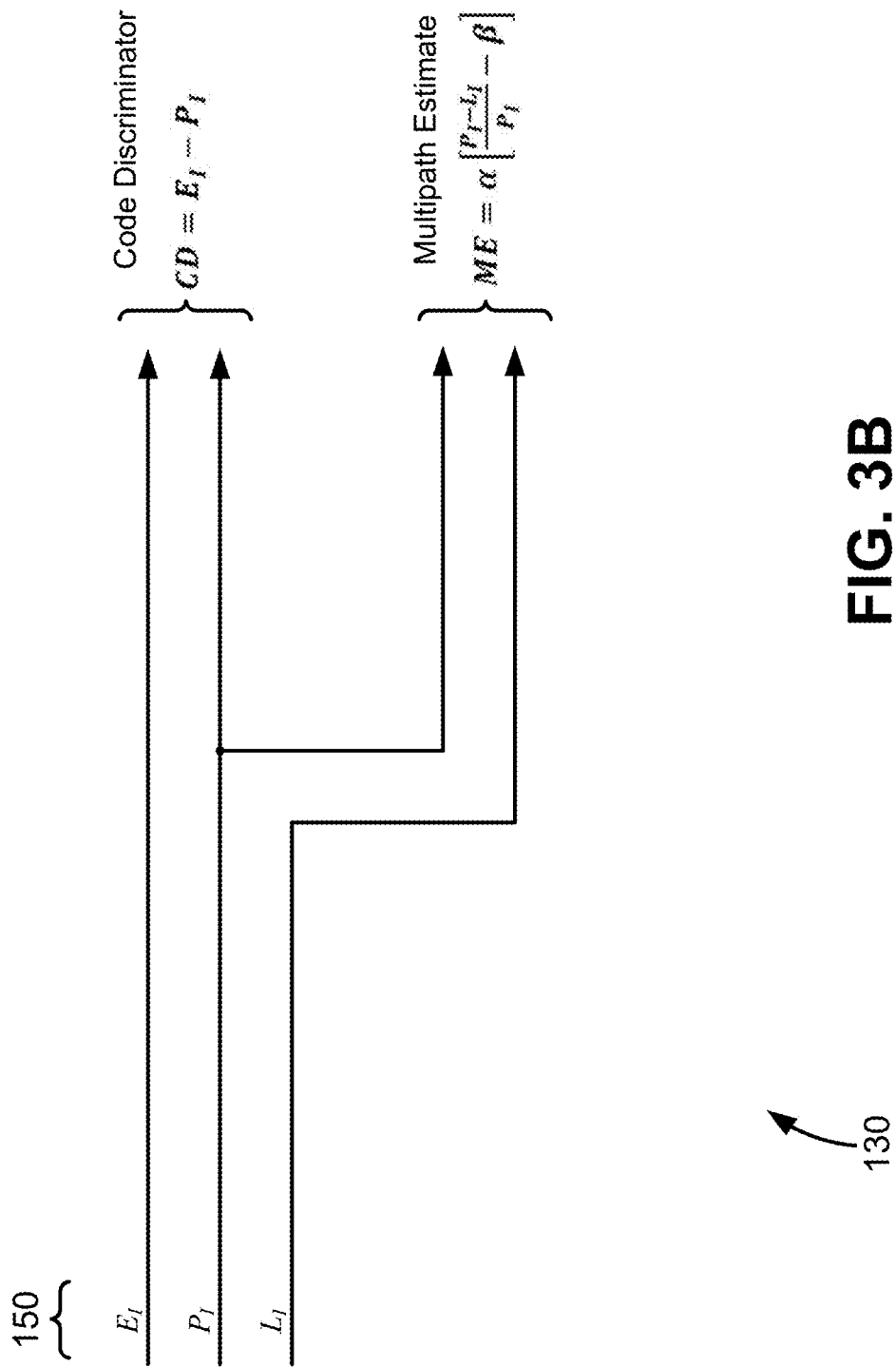

FIGS. 3A and 3B illustrate an example of correlator 130 in accordance with a conventional technique. Correlator 130 receives complex IF samples 140 as an input (which may be equivalent to digital samples 128) comprising in-phase and quadrature components I and Q, respectively. A local carrier generator 142 may generate samples that are mixed with complex IF samples 140 using multiplier 143. The samples generated by local carrier generator 142 may include samples of an IF sine wave such that complex base band (BB) samples 144 are outputted by mixer 143. Correlator 130 performs three correlations on the in-phase component of complex BB samples 144 ($I_{bb}$) using three different local codes generated by a local code generator 146 to produce three correlation results 150. The three local codes include: local code E corresponding to a sampled replica of the PRN code shifted earlier in time, i.e., early, local code P corresponding to a sampled replica of the PRN code aligned in time, i.e., prompt, and local code L corresponding to a sampled replica of the PRN code shifted later in time, i.e., late.

When both complex BB samples 144 and the local codes are available, a first correlation result $E_I$ is generated by correlating $I_{bb}$ with local code E by multiplying each value of $I_{bb}$ with a corresponding value of local code E using multiplier 145-1 and then summing all of the multiplication results using one of integrators 148. In some instances, $I_{bb}$ and E are vectors and $E_I$ is a scalar. A second correlation result $P_I$ is generated by correlating $I_{bb}$ with local code P by multiplying each value of $I_{bb}$ with a corresponding value of local code P using multiplier 145-2 and then summing all of the multiplication results using one of integrators 148. A third correlation result $L_I$ is generated in a similar manner using local code L and multiplier 145-3.

In the conventional approach, a code discriminator CD is defined as $CD=E_I-P_I$. The code discriminator is driven toward zero through an iterative process by adjusting the time delays associated with the local codes and reperforming the correlations. When the code discriminator is zero or within some threshold of zero, a distance estimate is generated. The distance estimate is refined using a multipath estimate ME defined as $$ME = \alpha\left[\frac{P_I - L_I}{P_I} - \beta\right].$$

Figure 4A:
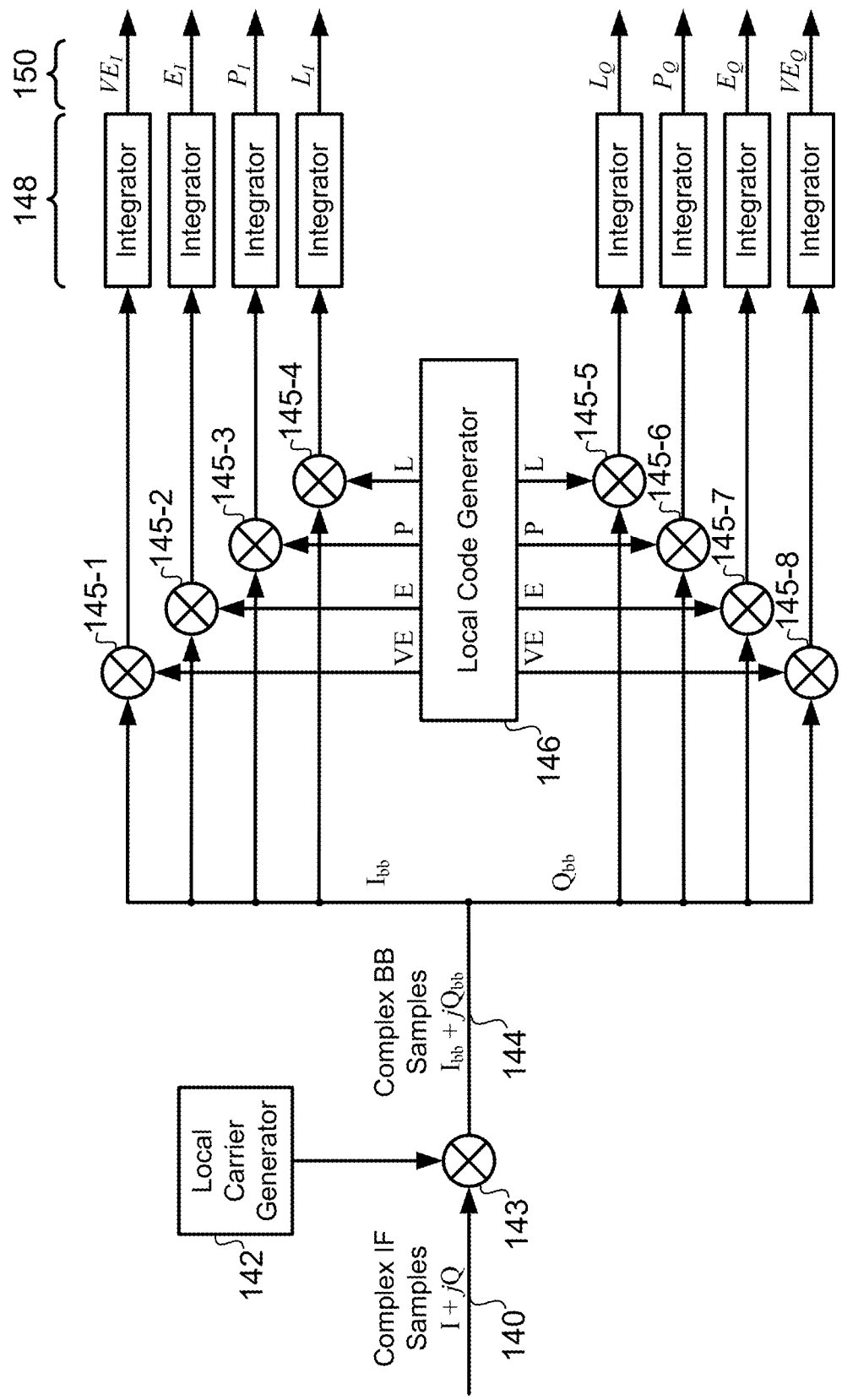
FIGS. 4A and 4B illustrate an example of a correlator, according to an embodiment of the present disclosure.
Figure 4B:
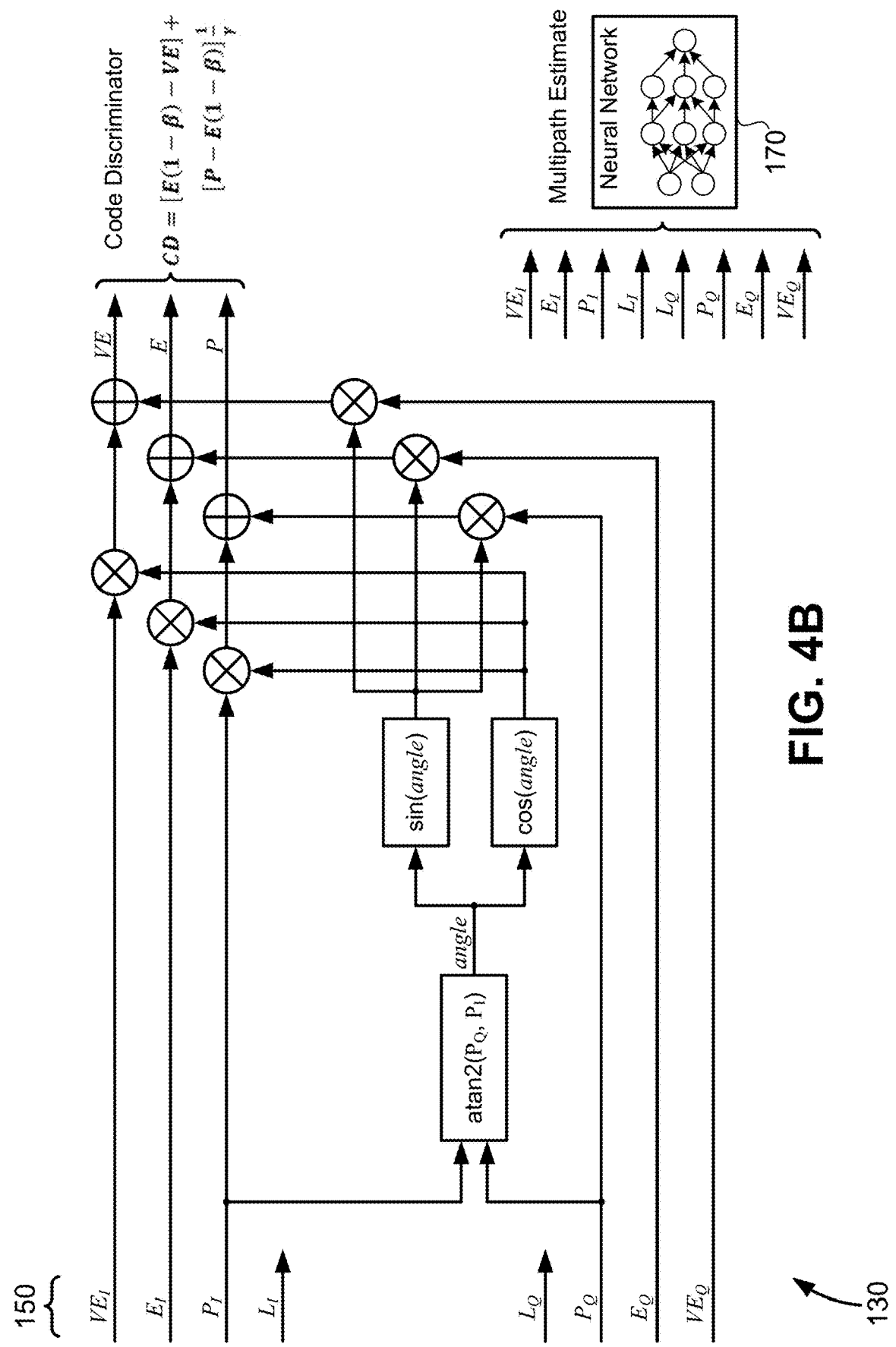

FIGS. 4A and 4B illustrate an example of correlator 130 that employs a "slope" code discriminator, according to an embodiment of the present disclosure. As described previously, correlator 130 receives complex IF samples 140 as an input (which may be equivalent to digital samples 128) comprising in-phase and quadrature components I and Q, respectively. Samples generated by local carrier generator 142 are mixed with complex IF samples 140 using multiplier 143 resulting in complex BB samples 144. In some embodiments, correlator 130 performs eight correlations, four on the in-phase component of complex BB samples 144 ($I_{bb}$) and four on the quadrature component of complex BB samples 144 ($Q_{bb}$) using four local codes generated by local code generator 146, producing eight correlation results 150. The four local codes include: local code VE corresponding to a sampled replica of the PRN code shifted earlier in time than that for E, i.e., very early, local code E corresponding to a sampled replica of the PRN code shifted earlier in time, i.e., early, local code P corresponding to a sampled replica of the PRN code aligned in time, i.e., prompt, and local code L corresponding to a sampled replica of the PRN code shifted later in time, i.e., late.

Correlator 130 performs eight correlations and generates eight correlation results 150 as follows. A first correlation result $VE_I$ is generated by correlating $I_{bb}$ with local code E by multiplying each value of $I_{bb}$ with a corresponding value of local code VE using multiplier 145-1 and then summing all of the multiplication results using one of integrators 148. A second correlation result $E_I$ is generated by correlating $I_{bb}$ with local code E by multiplying each value of $I_{bb}$ with a corresponding value of local code E using multiplier 145-2 and then summing all of the multiplication results using one of integrators 148. A third correlation result $P_I$ is generated by correlating $I_{bb}$ with local code P by multiplying each value of $I_{bb}$ with a corresponding value of local code P using multiplier 145-3 and then summing all of the multiplication results using one of integrators 148. A fourth correlation result $L_I$ is generated by correlating $I_{bb}$ with local code L by multiplying each value of $I_{bb}$ with a corresponding value of local code L using multiplier 145-4 and then summing all of the multiplication results using one of integrators 148.

A fifth correlation result $L_Q$ is generated by correlating $Q_{bb}$ with local code L by multiplying each value of $Q_{bb}$ with a corresponding value of local code L using multiplier 145-5 and then summing all of the multiplication results using one of integrators 148. A sixth correlation result $P_Q$ is generated by correlating $Q_{bb}$ with local code P by multiplying each value of $Q_{bb}$ with a corresponding value of local code P using multiplier 145-6 and then summing all of the multiplication results using one of integrators 148. A seventh correlation result $E_Q$ is generated by correlating $Q_{bb}$ with local code E by multiplying each value of $Q_{bb}$ with a corresponding value of local code E using multiplier 145-7 and then summing all of the multiplication results using one of integrators 148. An eighth correlation result $VE_Q$ is generated by correlating $Q_{bb}$ with local code VE by multiplying each value of $Q_{bb}$ with a corresponding value of local code VE using multiplier 145-8 and then summing all of the multiplication results using one of integrators 148.

Correlation results 150 are used to compute code discriminator CD which is defined as:

$$CD = [E(1-\beta) - VE] + [P - E(1-\beta)]\frac{1}{\gamma}$$

where VE is an adjusted first correlation result defined as $VE=VE_Q \sin(angle)+VE_Q \cos(angle)$, E is an adjusted second correlation result defined as $E=E_Q \sin(angle)+E_I \cos(angle)$, and P is an adjusted third correlation result defined as $P=P_Q \sin(angle)+P_I \cos(angle)$, and where angle=a tan 2($P_Q$, $P_I$). Adjusted correlation results VE, E, and P may be computed using the hardware components shown in FIG. 4B (e.g., six multipliers, three adders, a tan 2( ) circuit, and cos( ) circuit), or may be computed by receiver processor 132. Code discriminator CD may then be computed by correlator 130, in hardware or software, or by receiver processor 132. In some instances, after code discriminator CD is computed by correlator 130 it is sent to receiver processor 132.

Code discriminator CD is dependent on constants β and γ which may take on a wide range of values. In some instances, β is GNSS-satellite based and between zero and one, and γ is multipath based and greater than zero. Constants β and γ change how code discriminator CD behaves when multipath interference is present. For example, increasing β toward one causes code discriminator CD to increasingly ignore correlation result E and respond more to correlation results VE and P. Modifying γ can significantly improve performance during multipath interference by forcing code discriminator CD to drift to the left/early if the correlation function is flattened by multipath. In some instances, significant improved behavior was observed where γ=3. The effect of γ can be better illustrated by characterizing the equation for code discriminator CD as the sum of two slopes:

CD=First Slope+Second Slope×Weighting Factor where the first slope is equal to [E(1-β)-VE], the second slope is equal to [P-E(1-β)], and the weighting factor is equal to $$\frac{1}{\gamma}.$$

Because γ is greater than zero, the weighting factor can take on any value greater than zero. In some embodiments, γ is greater than one which causes the weighting factor to take on a value between zero and one.

In some instances, receiver processor 132 determines whether code discriminator CD is equal to zero or within some threshold of zero (e.g., −0.1<CD<0.1). If it is determined that code discriminator CD is nonzero, i.e., outside the threshold, receiver processor 132 generates a correction amount for shifting one or more of the local codes in order to drive code discriminator CD closer to zero. The correction amount may be sent by receiver processor 132 to correlator 130, and local code generator 146 may cause locals codes VE, E, P, and L to be shifted earlier or later in accordance with the correction amount, and correlations between complex BB samples 144 and the local codes may be reperformed. The iterative process may continue until it is determined that code discriminator CD is zero or within some threshold of zero, and then receiver processor 132 may generate a distance estimate between GNSS receiver 110 and one of GNSS satellites 102. Receiver processor 132 may determine a position estimate of GNSS receiver 110 using multiple distance estimates between GNSS receiver 110 and multiple GNSS satellites 102.

In some embodiments, adjusted correlation results VE, E, and P may directly correspond to correlation results $VE_I$, $E_I$, and $P_I$ such that $VE=E_I$, $E=E$, and $P=P_I$. For example, in some embodiments correlator 130 may ignore correlation results $L_I$, $L_Q$, $P_Q$, $E_Q$, and $VE_Q$ when computing code discriminator CD. Use of all depicted correlation results improves performance by rotating $VE_I$, $E_I$, and $P_I$ by the $P_I/P_Q$ angle, allowing code discriminator CD to perform properly in both coherent and non-coherent modes. In some embodiments, by default, adjusted correlation results VE, E, and P are equal to correlation results $VE_I$, $E_I$, and $P_I$ unless a power detection circuit coupled to correlation results $L_Q$, $P_Q$, $E_Q$, and $VE_Q$ determines that the power of the quadrature component of the auto-correlation function exceeds a predetermined threshold. When the power detection circuit determines that the power of the quadrature component exceeds the predetermined threshold, the hardware components depicted in FIG. 4B for computing adjusted correlation results VE, E, and P are implemented and not bypassed. In some embodiments, the power detection circuit is a comparator integrated circuit having a first input as correlation result $P_Q$ and a second input as the predetermined threshold.

In some embodiments, a generalized code discriminator $CD_G$ having M correlation results can be expressed as the sum of multiple slopes as $$CD_G = \sum_{i=1}^{M_{mid}} \frac{(1-\beta)C_{i+1} - C_i}{\alpha_i} - \sum_{i=M_{mid}+1}^{M-1} \frac{(1-\beta)C_i - C_{i+1}}{\gamma_i}$$

where $C_i$ is the $i^{th}$ correlation result (i.e., output of the $i^{th}$ correlator, e.g., E, E, P, etc.), $$M_{mid} = \left\lfloor \frac{M}{2} \right\rfloor, \sum_{i=1}^{M_{mid}} \frac{1}{\alpha_i} = 1, \text{ and } 0 < \sum_{i=M_{mid}+1}^{M-1} \frac{1}{\gamma_i} < 1.$$

In some embodiments, generalized code discriminator $CD_G$ may be simplified such that $\alpha_i = M_{mid}$ and $\gamma_i = \gamma(M - M_{mid} - 1)$. In some embodiments, if M=3, then $C_1$=VE, $C_2$=E, $C_3$=P, $M_{mid} = \lfloor 3/2 \rfloor = 1$, $\alpha_1 = M_{mid} = 1$, and $\gamma_2 = \gamma(M - M_{mid} - 1) = \gamma$. In some embodiments, if M=4, then $C_1$=VE, $C_2$=E, $C_3$=P, $C_4$=L, $M_{mid} = \lfloor 4/2 \rfloor = 2$, $\alpha_1 = M_{mid} = 2$, $\alpha_2 = \alpha_1 = 2$, and $\gamma_3 = \gamma(M - M_{mid} - 1) = \gamma$. In some embodiments, if M=5, then $C_1$=VE, $C_2$=E, $C_3$=P, $C_4$=L, $C_5$=VL $M_{mid} = \lfloor 5/2 \rfloor = 2$, $\alpha_1 = M_{mid} = 2$, $\alpha_2 = \alpha_1 = 2$, $\gamma_3 = \gamma(M - M_{mid} - 1) = 2\gamma$, and $\gamma_4 = \gamma_3 = 2\gamma$.

In some embodiments, correlation results $VE_I$, $E_I$, $P_I$, $L_I$, $L_Q$, $P_Q$, $E_Q$, and $VE_Q$ are used by a neural network 170 to generate a multipath estimate which may be used to refine distance estimates. Neural network 170 is a function mapping of a set of inputs to a set of outputs that is trained with a set of inputs having known outputs. For example, neural network 170 may be trained using a GNSS receiver having a known distance to a particular GNSS satellite, or multiple known distances to multiple satellites. Neural network 170 includes various nodes, including input nodes, hidden layers, and output nodes. The input nodes can be filled in directly from raw data, although normalizing or filtering the raw data may improve performance. Normalizing may include performing a log( ) or diff( ) on the raw data. All the other nodes pass the weighted sum of all inputs through a mapping function. For example, an output node, C, may be expressed as $$C = f(w0*A + w1*B)$$

where A and B are input nodes and w0 and w1 are parameters determined by training neural network 170. The function f( ) is a design parameter of neural network 170, which in some embodiments may correspond to tan h( ) or sigmoid( ). Neural network 170 may have any number of inputs, hidden layers, nodes in hidden layers, and outputs.

In some embodiments, the inputs of neural network 170 include the last N seconds (e.g., 30 seconds) of:
Rotated and normalized VE, P, and L, i.e., rotate all the energy in-phase using the $P_I/P_Q$ angle,
Normalized signal-to-noise ratio (SNR), e.g., in dbHz/50,
Satellite slope, e.g., same as β,
Normalized elevation, e.g., in degrees/90,
High-pass filtered code minus carrier clipped to +/−2 meters.

Figure 5:
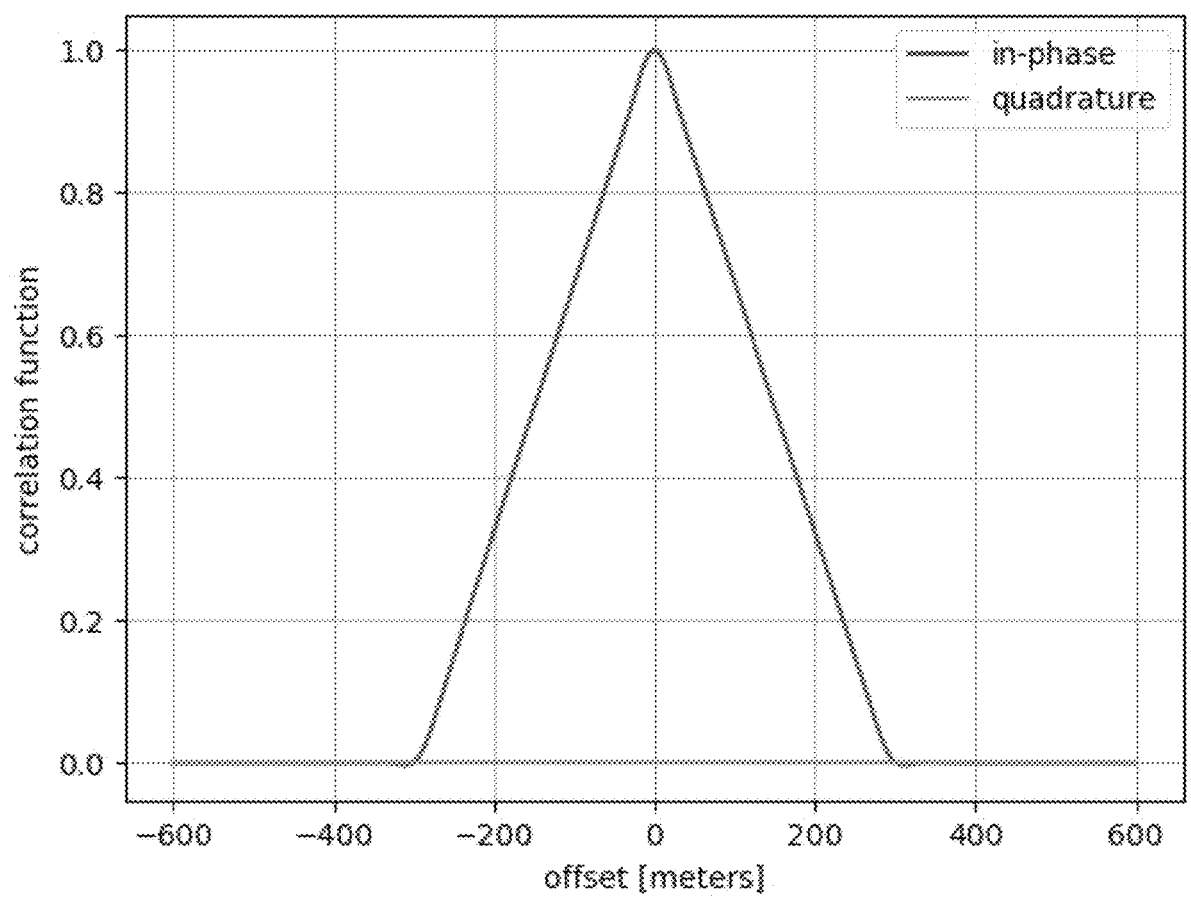
FIG. 5 illustrates a correlation function, according to an embodiment of the present disclosure.

FIG. 5 illustrates an ideal correlation function in the absence of multipath interference and with coherent tracking, according to an embodiment of the present disclosure. In some embodiments, an ideal correlation function includes a triangular in-phase component and a quadrature component equal to zero. In a non-coherent tracking mode, energy may rotate back and forth between the in-phase and quadrature components.

Figure 6:
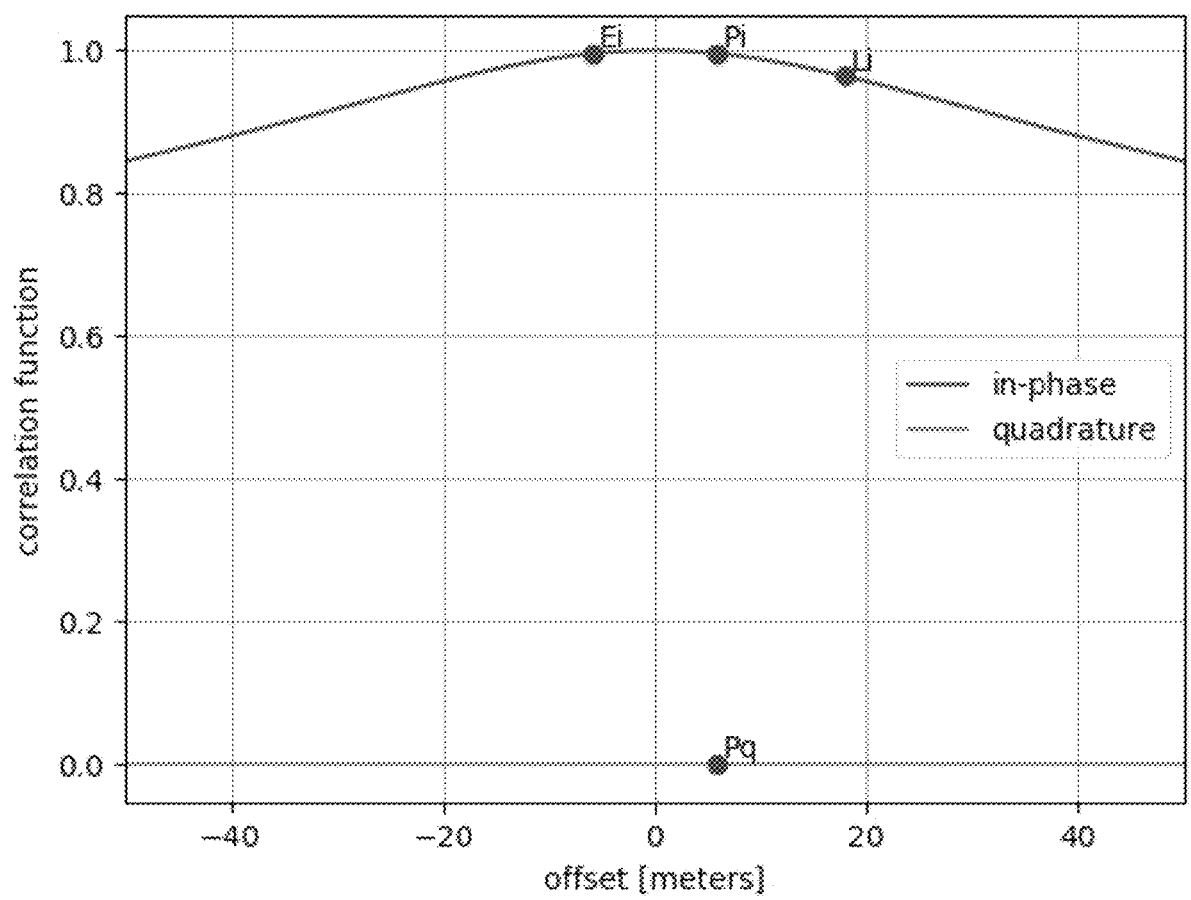
FIG. 6 illustrates a correlation function and corresponding correlation results, according to an embodiment of the present disclosure.

FIG. 6 illustrates a correlation function and correlation results $E_I$, $P_I$, and $L_I$ using the conventional approach described in reference to FIGS. 3A and 3B. The spacing between local codes E, P, and L is about 12 meters, which can be adjusted. Code discriminator CD as defined in reference to FIGS. 3A and 3B is zero when $E_I = P_I$.

Figure 7:
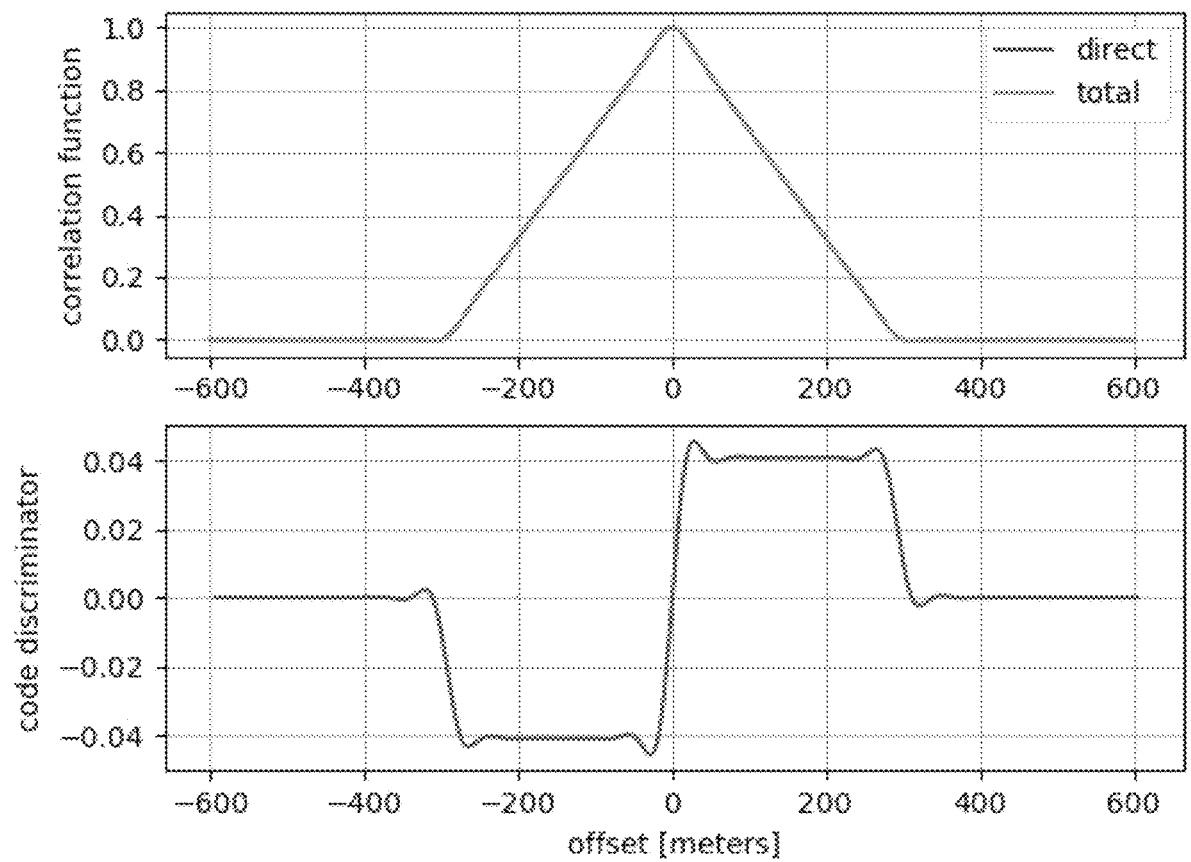
FIG. 7 illustrates a correlation function and a corresponding code discriminator plot, according to an embodiment of the present disclosure.

FIG. 7 illustrates a correlation function and a corresponding code discriminator plot using the conventional approach described in reference to FIGS. 3A and 3B. A search mode that precedes a tracking mode initializes the code discriminator within +/−100 meters of the peak of the auto-correlation function. The tracking mode then uses the code discriminator to find the peak. If code discriminator CD is negative, then the local codes are shifted right. If code discriminator CD is positive, then the local codes are shifted left. When code discriminator CD is zero, it is determined that a lock with GNSS satellite 102 has occurred. In the ideal scenario, code discriminator CD is zero when the offset is zero meters so there is no tracking error. The tracking loop output (combined with data from GNSS satellites 102) allow computation of a distance estimate (i.e., a pseudorange). A pseudorange may not be a true range because it contains an unknown clock term.

Figure 8:
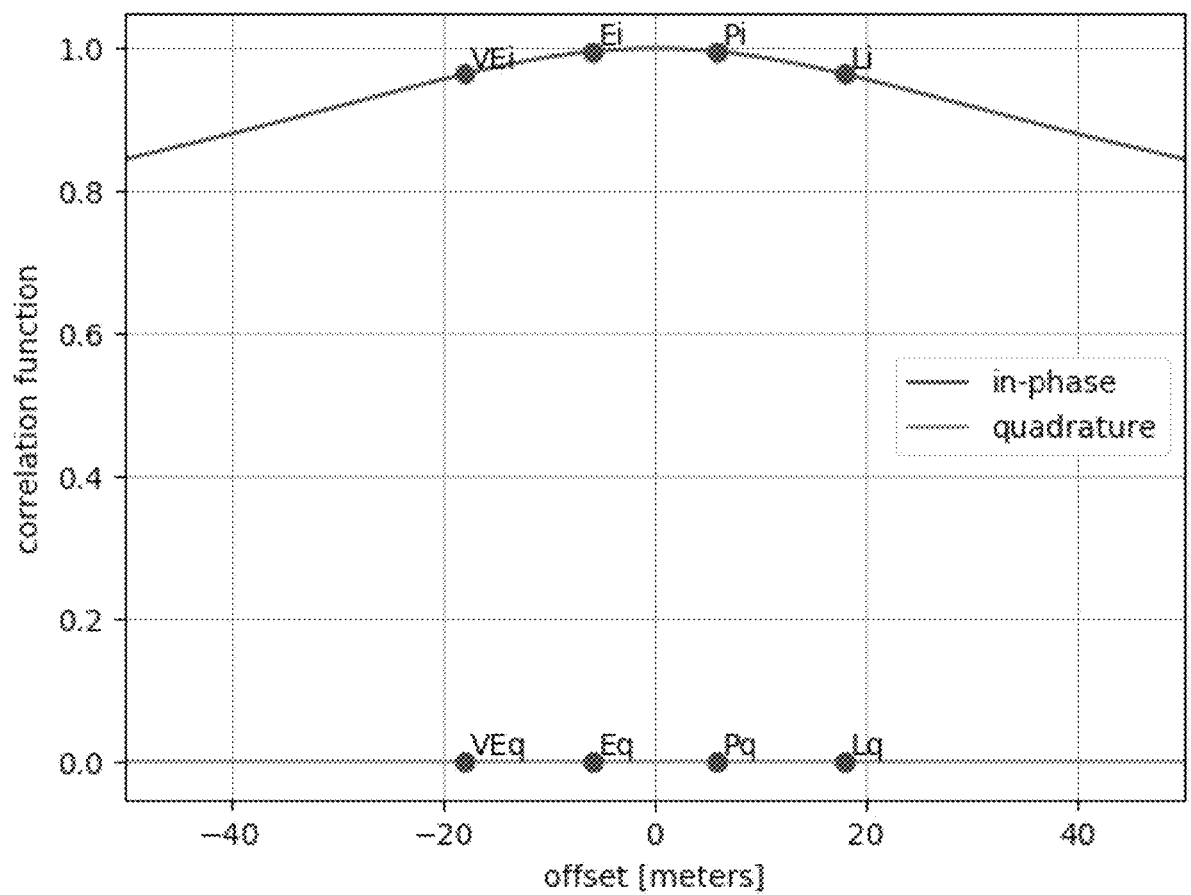
FIG. 8 illustrates a correlation function and corresponding correlation results, according to an embodiment of the present disclosure.

FIG. 8 illustrates an ideal correlation function and correlation results $VE_I$, $E_I$, $P_I$, $L_I$, $L_Q$, $P_Q$, $E_Q$, and $VE_Q$ in the absence of multipath interference and with coherent tracking, according to an embodiment of the present disclosure. The spacing between local codes VE, E, P, and L is about 12 meters. In heavy tree multipath environments the correlation function often flattens out on top and the conventional code discriminator (i.e., $CD=E_I-P_I$) performs poorly as it can drift anywhere along the entire flattened top. When the correlation function has a flattened top, code discriminator CD as defined in reference to FIGS. 4A and 4B is able to drift to the left/early side of the correlation function by increasing γ to a suitable value.

Figure 9:
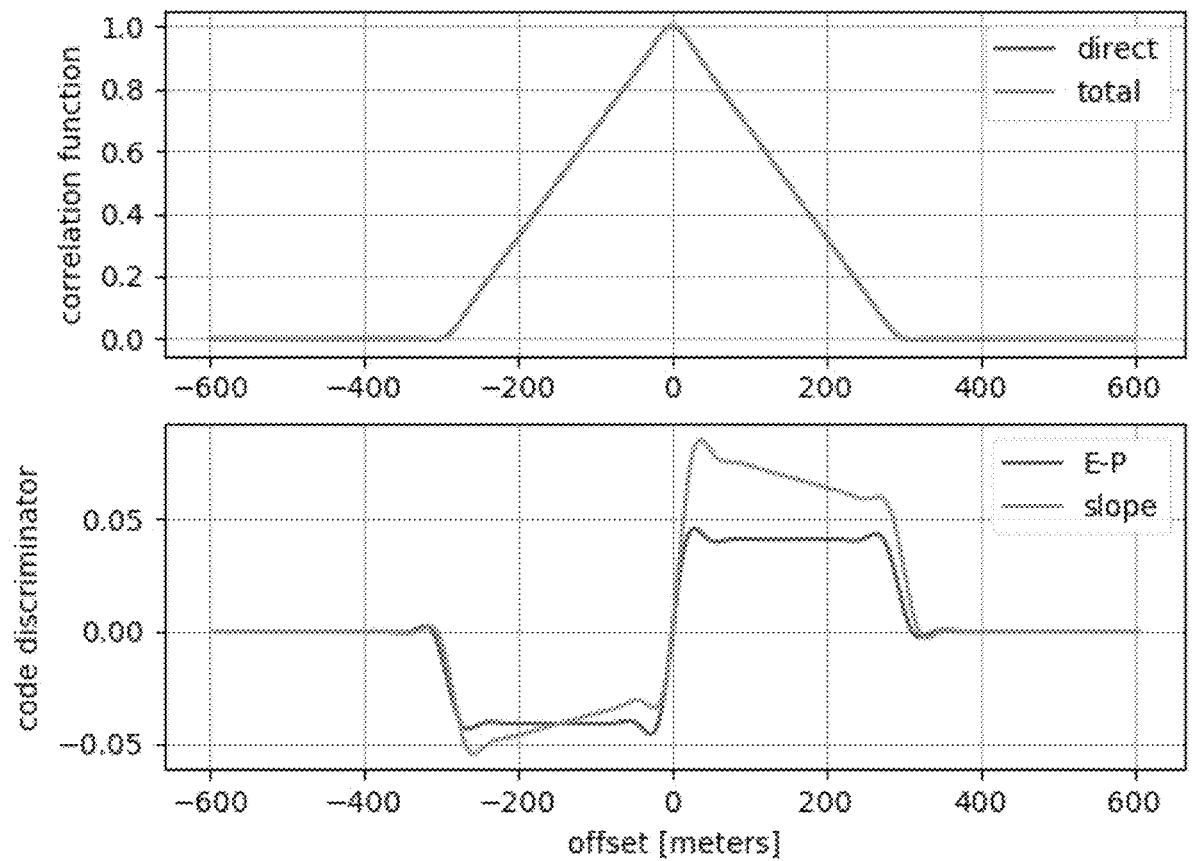
FIG. 9 illustrates an ideal correlation function and a corresponding code discriminator plot, according to an embodiment of the present disclosure.

FIG. 9 illustrates an ideal correlation function and a corresponding code discriminator plot, according to an embodiment of the present disclosure. For the code discriminator plot, the "E-P" label corresponds to code discriminator CD using the conventional approach (described in reference to FIGS. 3A and 3B), and the "slope" label corresponds to code discriminator CD using the approach described in reference to FIGS. 4A and 4B, which may be referred to as the slope code discriminator. The conventional code discriminator and the slope code discriminator are both equal to zero at an offset of zero meters, so neither has a tracking error in ideal conditions.

Figure 10:
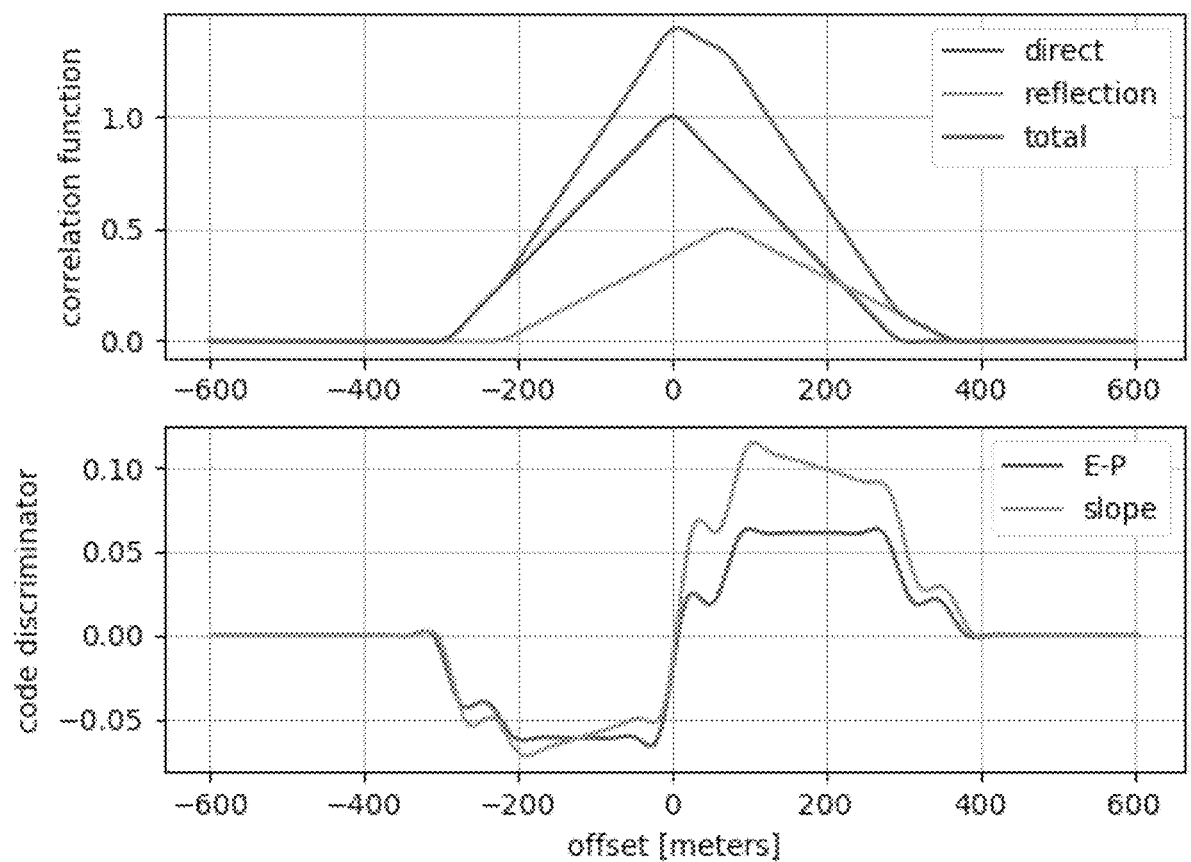
FIG. 10 illustrates a correlation function and a corresponding code discriminator plot, according to an embodiment of the present disclosure.

FIG. 10 illustrates a correlation function and a corresponding code discriminator plot in which one reflected multipath signal with positive amplitude ("reflection" line) is present. It is important to note that the "total" correlation function is all that can be physically observed by the code discriminator calculations. The conventional code discriminator and the slope code discriminators no longer find the true offset of zero meters. However, it can be observed that the slope code discriminator comes closer to the true offset. The conventional code discriminator has an error of 7.3 meters and the slope code discriminator has an error of 4.8 meters.

Figure 11:
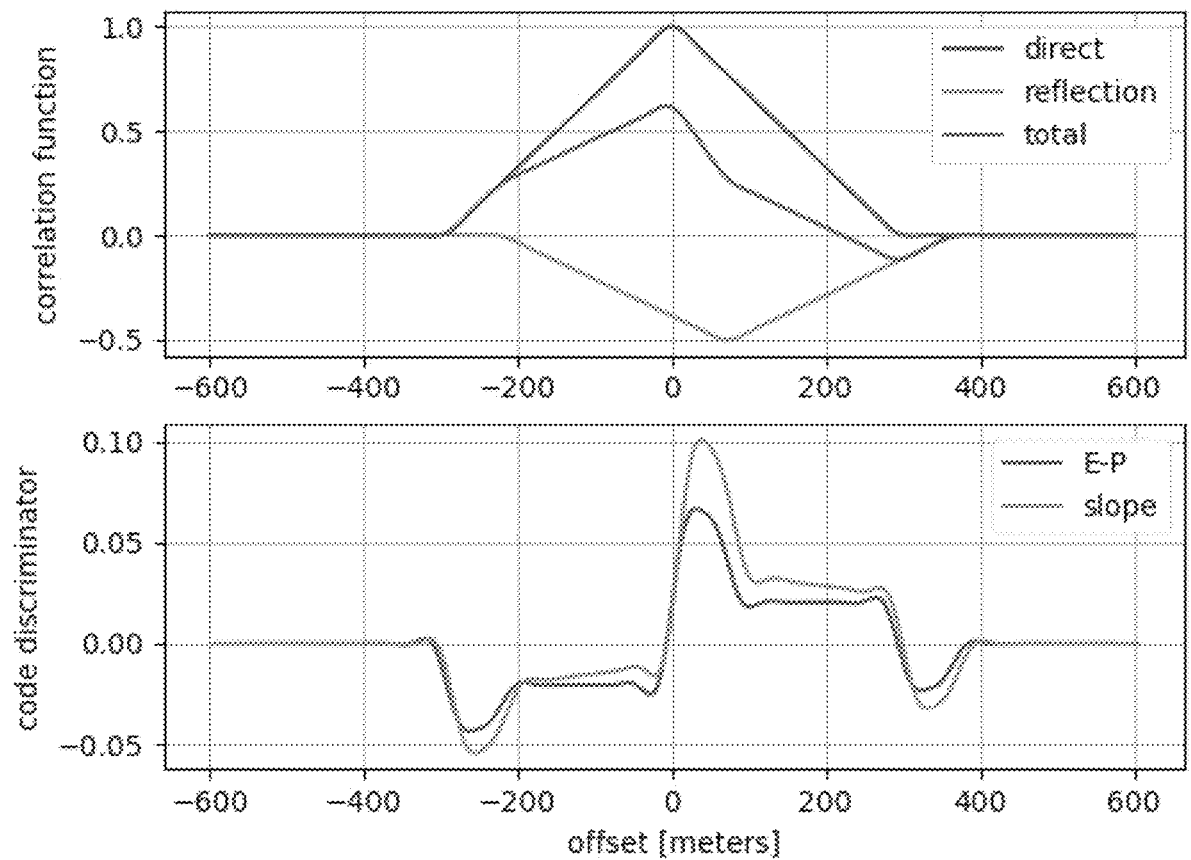
FIG. 11 illustrates a correlation function and a corresponding code discriminator plot, according to an embodiment of the present disclosure.

FIG. 11 illustrates a correlation function and a corresponding code discriminator plot in which one reflected multipath signal with negative amplitude is present. Although both code discriminators still have an error, the error for the conventional code discriminator is −7.3 meters and the error for the slope code discriminator is −6.6 meters.

Figure 12:
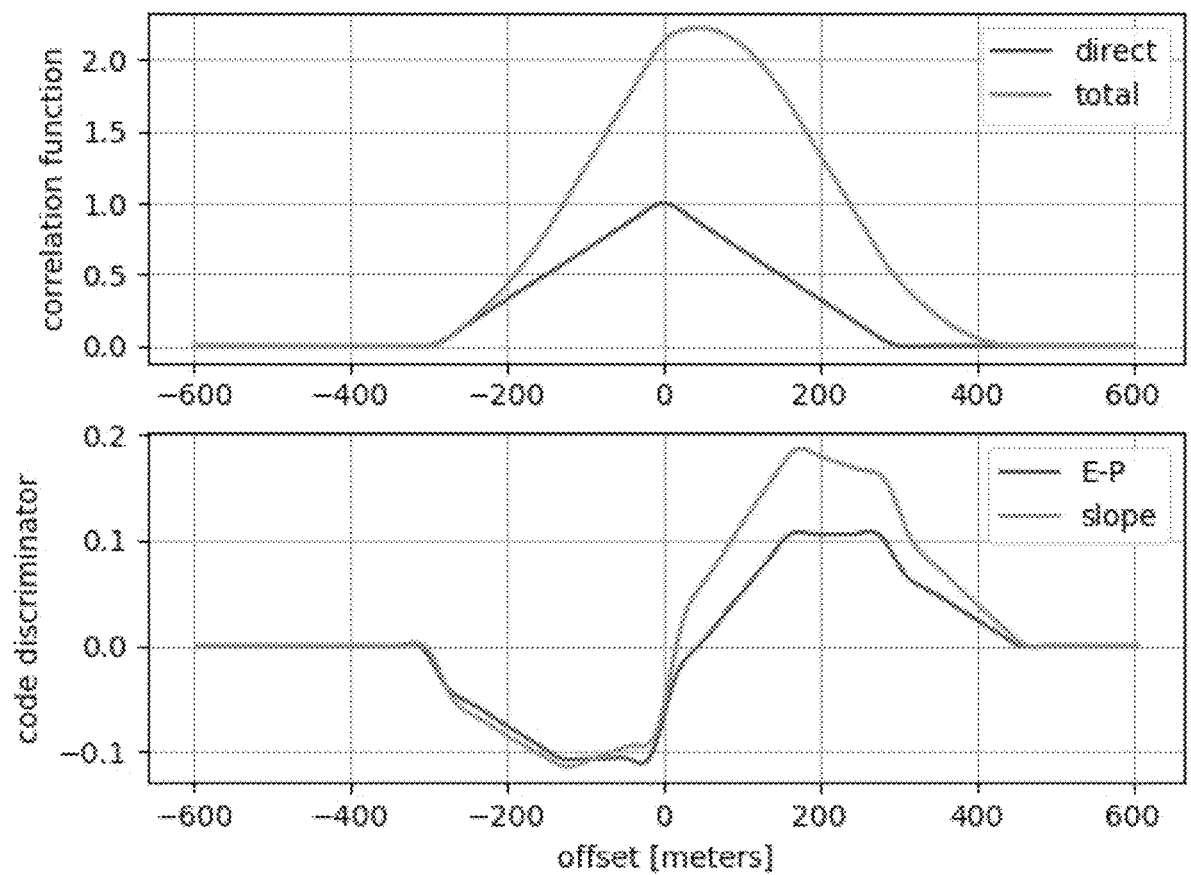
FIG. 12 illustrates a correlation function and a corresponding code discriminator plot, according to an embodiment of the present disclosure.

FIG. 12 illustrates a correlation function and a corresponding code discriminator plot in which various multipath signals are present due to, for example, GNSS receiver 110 being under a tree. The conventional code discriminator error is 44.3 meters and the slope code discriminator error is 16.1 meters.

Figure 13:
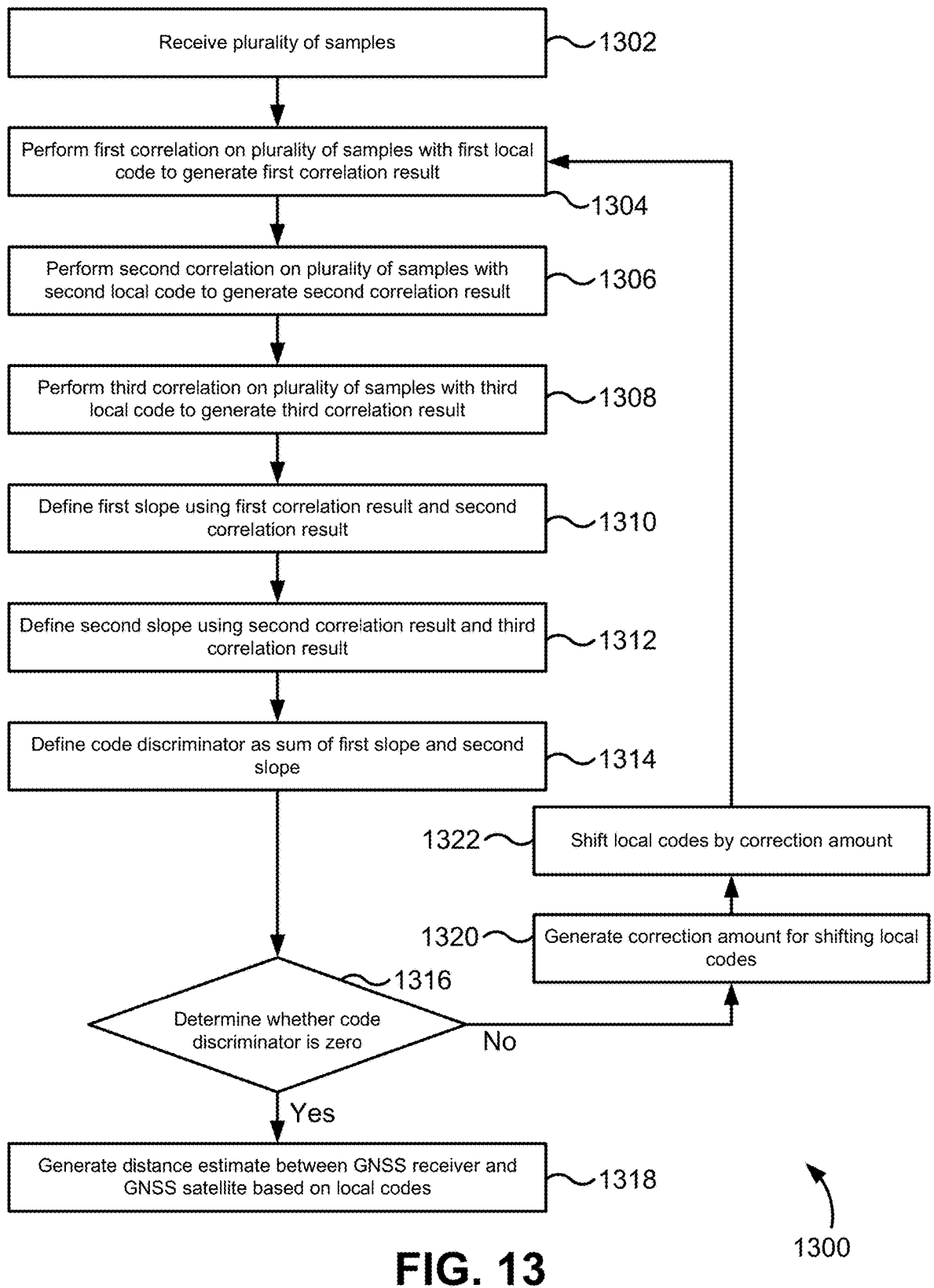
FIG. 13 illustrates a method for processing samples related to wireless signals received from a GNSS satellite, according to an embodiment of the present disclosure.

FIG. 13 illustrates a method 1300 for processing samples related to wireless signals received from a GNSS satellite, according to an embodiment of the present disclosure. At block 1302, a plurality of samples related to the wireless signals are received. At block 1304, a first correlation on the plurality of samples is performed with a first local code using a first multiplier to generate a first correlation result. At block 1306, a second correlation on the plurality of samples is performed with a second local code using a second multiplier to generate a second correlation result. At block 1308, a third correlation on the plurality of samples is performed with a third local code using a third multiplier to generate a third correlation result. At block 1310, a first slope using the first correlation result and the second correlation result is defined. At block 1312, a second slope using the second correlation result and the third correlation result is defined. At block 1314, a code discriminator is defined as a sum of the first slope and the second slope.

At block 1316, it is determined whether the code discriminator is zero. If it is determined that the code discriminator is zero, then method 1300 proceeds to block 1318. If it is determined that the code discriminator is nonzero, then method 1300 proceeds to block 1320. At block 1320, a correction amount for shifting each of the first local code, the second local code, and the third local code is generated to drive the code discriminator toward zero. At block 1322, each of the first local code, the second local code, and the third local code are shifted by the correction amount. After block 1322 is performed, method 1300 proceeds to block 1304. At block 1318, a distance estimate between the GNSS receiver and the GNSS satellite is generated based on one or more of the first local code, the second local code, and the third local code.

Figure 14:
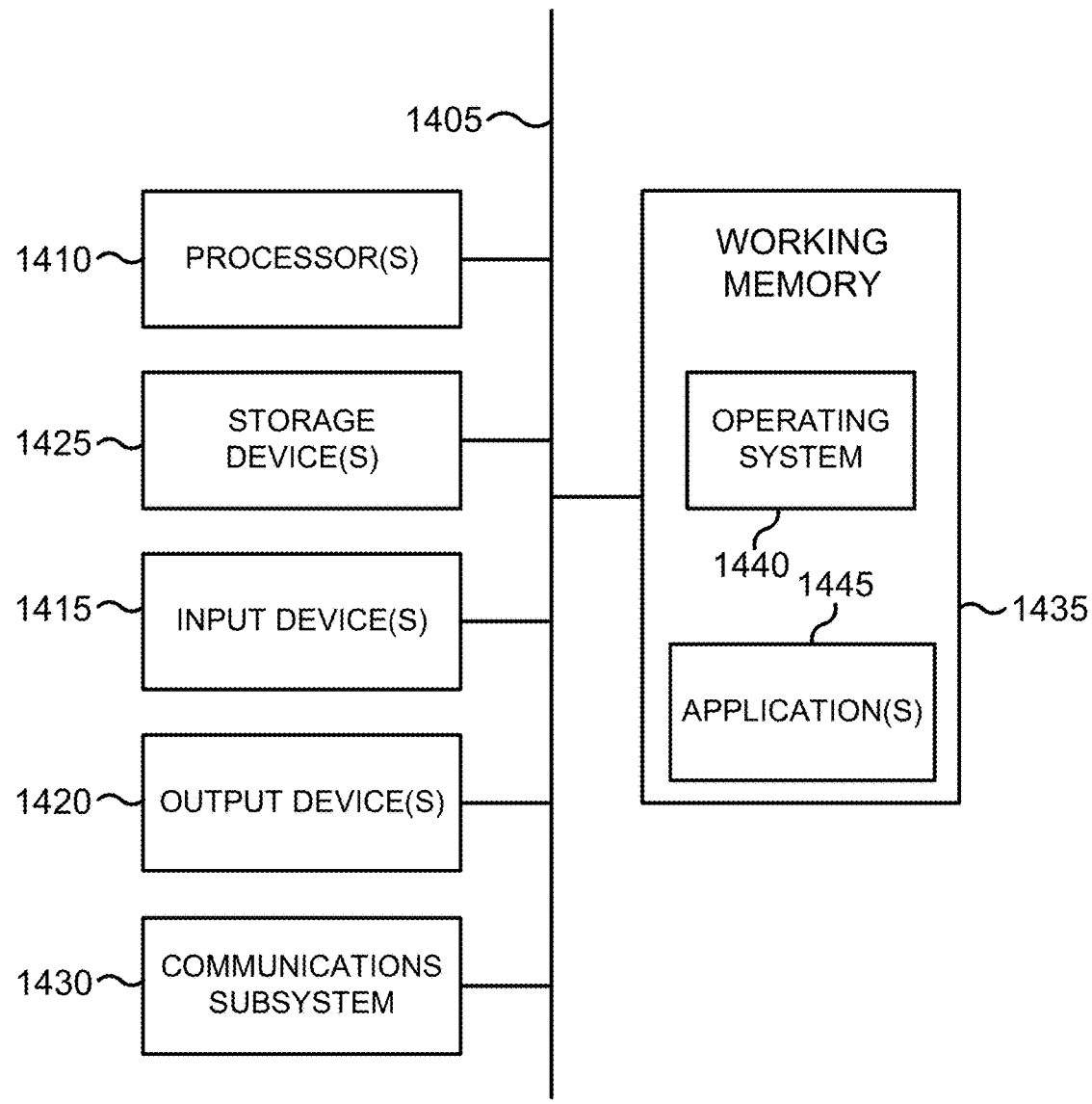
FIG. 14 illustrates a simplified computer system, according to an embodiment of the present disclosure.

FIG. 14 illustrates a simplified computer system 1400, according to an embodiment of the present disclosure. A computer system 1400 as illustrated in FIG. 14 may be incorporated into devices such as a portable electronic device, mobile phone, or other device as described herein. FIG. 14 provides a schematic illustration of one embodiment of a computer system 1400 that can perform some or all of the steps of the methods provided by various embodiments. It should be noted that FIG. 14 is meant only to provide a generalized illustration of various components, any or all of which may be utilized as appropriate. FIG. 14, therefore, broadly illustrates how individual system elements may be implemented in a relatively separated or more integrated manner.

The computer system 1400 is shown comprising hardware elements that can be electrically coupled via a bus 1405, or may otherwise be in communication, as appropriate. The hardware elements may include one or more processors 1410, including without limitation one or more general-purpose processors and/or one or more special-purpose processors such as digital signal processing chips, graphics acceleration processors, and/or the like; one or more input devices 1415, which can include, without limitation a mouse, a keyboard, a camera, and/or the like; and one or more output devices 1420, which can include, without limitation a display device, a printer, and/or the like.

The computer system 1400 may further include and/or be in communication with one or more non-transitory storage devices 1425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1400 might also include a communications subsystem 1430, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1430 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1430. In other embodiments, a portable electronic device, e.g. the first electronic device, may be incorporated into the computer system 1400, e.g., an electronic device as an input device 1415. In some embodiments, the computer system 1400 will further comprise a working memory 1435, which can include a RAM or ROM device, as described above.

The computer system 1400 also can include software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1425 described above. In some cases, the storage medium might be incorporated within a computer system, such as computer system 1400. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1400 and/or might take the form of source and/or installable code, which, upon compilation and/or installation on the computer system 1400 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 1400 to perform methods in accordance with various embodiments of the technology. According to a set of embodiments, some or all of the procedures of such methods are performed by the computer system 1400 in response to processor 1410 executing one or more sequences of one or more instructions, which might be incorporated into the operating system 1440 and/or other code, such as an application program 1445, contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processor(s) 1410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1425. Volatile media include, without limitation, dynamic memory, such as the working memory 1435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400.

The communications subsystem 1430 and/or components thereof generally will receive signals, and the bus 1405 then might carry the signals and/or the data, instructions, etc. carried by the signals to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A global navigation satellite system (GNSS) receiver comprising:
   an antenna for receiving wireless signals transmitted by a GNSS satellite;
   a radio frequency (RF) front end coupled to the antenna and configured to generate a plurality of samples related to the wireless signals;
   a correlator coupled to the RF front end, the correlator configured to perform operations including:
      receiving the plurality of samples from the RF front end;
      performing a first correlation on the plurality of samples with a first local code using a first multiplier to generate a first correlation result;
      performing a second correlation on the plurality of samples with a second local code using a second multiplier to generate a second correlation result; and
      performing a third correlation on the plurality of samples with a third local code using a third multiplier to generate a third correlation result, wherein the first local code, the second local code, and the third local code are shifted in time or distance with respect to each other; and
   a processor coupled to the correlator, the processor configured to perform actions including:
      defining a first slope as a first difference between the first correlation result and the second correlation result;
      defining a second slope as a second difference between the second correlation result and the third correlation result;
      scaling the second slope by a weighting factor greater than zero and less than one; and
      defining a code discriminator as a sum of the first slope and the scaled second slope.

2. The GNSS receiver of claim 1, wherein the actions further include:
   determining that the code discriminator is nonzero;
   generating a correction amount for shifting each of the first local code, the second local code, and the third local code to drive the code discriminator toward zero; and
   sending the correction amount to the correlator.

3. The GNSS receiver of claim 2, wherein the operations further include:
   receiving the correction amount from the processor;
   shifting each of the first local code, the second local code, and the third local code by the correction amount;
   performing, for a second time, the first correlation, the second correlation, and the third correlation; and
   causing an update of the code discriminator.

4. The GNSS receiver of claim 1, wherein the actions further include:
   determining that the code discriminator is approximately zero; and
   generating a distance estimate between the GNSS receiver and the GNSS satellite based on one or more of the first local code, the second local code, and the third local code.

5. A correlator for processing a plurality of samples related to wireless signals received from a global navigation satellite system (GNSS) satellite, the correlator configured to perform operations including:
   receiving the plurality of samples from a radio frequency (RF) front end coupled to an antenna, the RF front end configured to generate the plurality of samples related to the wireless signals;
   performing a first correlation on the plurality of samples with a first local code using a first multiplier to generate a first correlation result;
   performing a second correlation on the plurality of samples with a second local code using a second multiplier to generate a second correlation result; and
   performing a third correlation on the plurality of samples with a third local code using a third multiplier to generate a third correlation result, wherein the first local code, the second local code, and the third local code are shifted in time or distance with respect to each other;
   wherein a first slope is defined as a first difference between the first correlation result and the second correlation result;
   wherein a second slope is defined as a second difference between the second correlation result and the third correlation result;

wherein the second slope is scaled by a weighting factor greater than zero and less than one;
wherein a code discriminator is defined as a sum of the first slope and the scaled second slope.

6. The correlator of claim 5, wherein:
the code discriminator is determined to be nonzero; and
a correction amount for shifting each of the first local code, the second local code, and the third local code to drive the code discriminator toward zero is generated.

7. The correlator of claim 6, wherein the operations further include:
shifting each of the first local code, the second local code, and the third local code by the correction amount;
performing, for a second time, the first correlation, the second correlation, and the third correlation; and
causing an update of the code discriminator.

8. The correlator of claim 5, wherein:
the code discriminator is determined to be approximately zero; and
a distance estimate between a GNSS receiver and the GNSS satellite based on one or more of the first local code, the second local code, and the third local code is generated.

9. A method for processing samples related to wireless signals received from a global navigation satellite system (GNSS) satellite, the method comprising:
receiving a plurality of samples from a radio frequency (RF) front end coupled to an antenna, the RF front end configured to generate the plurality of samples related to the wireless signals;
performing a first correlation on the plurality of samples with a first local code to generate a first correlation result;
performing a second correlation on the plurality of samples with a second local code to generate a second correlation result;
performing a third correlation on the plurality of samples with a third local code to generate a third correlation result, wherein the first local code, the second local code, and the third local code are shifted in time or distance with respect to each other;
defining a first slope as a first difference between the first correlation result and the second correlation result;
defining a second slope as a second difference between the second correlation result and the third correlation result;
scaling the second slope by a weighting factor greater than zero and less than one; and
defining a code discriminator as a sum of the first slope and the scaled second slope.

10. The method of claim 9, further comprising:
determining that the code discriminator is nonzero; and
generating a correction amount for shifting each of the first local code, the second local code, and the third local code to drive the code discriminator toward zero.

11. The method of claim 10, further comprising:
shifting each of the first local code, the second local code, and the third local code by the correction amount;
performing, for a second time, the first correlation, the second correlation, and the third correlation; and
causing an update of the code discriminator.

12. The method of claim 9, further comprising:
determining that the code discriminator is approximately zero; and
generating a distance estimate between a GNSS receiver and the GNSS satellite based on one or more of the first local code, the second local code, and the third local code.

* * * * *